United States Patent [19]

Karwacki et al.

[11] Patent Number: 4,509,014
[45] Date of Patent: Apr. 2, 1985

[54] NUCLEAR MAGNETIC RESONANCE GYROSCOPE

[75] Inventors: Francis A. Karwacki, Harleysville; Joseph Griffin, Churchville, both of Pa.

[73] Assignee: The United States of America as represented by the Secretary of the Navy, Washington, D.C.

[21] Appl. No.: 444,001

[22] Filed: Nov. 23, 1982

[51] Int. Cl.³ ............................................. G01R 33/08
[52] U.S. Cl. .................................. 324/305; 335/296; 324/304
[58] Field of Search ............... 335/296, 298, 300; 324/318-320, 300, 305, 301, 302, 304

[56] References Cited

U.S. PATENT DOCUMENTS

| | | | |
|---|---|---|---|
| 3,030,556 | 4/1962 | Watson | 335/298 |
| 3,059,156 | 10/1962 | Moriva | 335/301 |
| 3,412,352 | 11/1968 | Watson | 355/298 |
| 3,500,176 | 3/1970 | Kastler et al. | 324/304 |
| 3,524,127 | 8/1970 | Conklin et al. | 324/304 |
| 3,566,255 | 2/1971 | Jaynes | 324/320 |
| 3,778,700 | 12/1973 | Bayley et al. | 324/302 |
| 3,919,678 | 11/1975 | Penfold | 335/296 |
| 4,114,087 | 9/1978 | Fry | 324/301 |
| 4,147,974 | 4/1979 | Greenwood | 324/301 |
| 4,157,495 | 6/1979 | Grover | 324/302 |
| 4,225,818 | 9/1980 | Gallop | 324/302 |
| 4,403,190 | 9/1983 | Greenwood | 324/304 |
| 4,406,986 | 9/1983 | Greenwood | 324/304 |
| 4,414,535 | 11/1983 | Ferriss | 324/304 |
| 4,430,616 | 2/1984 | Grover | 324/304 |

Primary Examiner—Michael J. Tokar
Attorney, Agent, or Firm—Robert F. Beers; Henry Hansen

[57] ABSTRACT

A nuclear magnetic resonance gyroscope which derives angular rotation thereof from the phases of precessing nuclear moments utilizes a single-resonance cell situated in the center of a uniform DC magnetic field. The field is generated by current flow through a circular array of coils between parallel plates. It also utilizes a pump and read-out beam and associated electronics for signal processing and control. Encapsulated in the cell for sensing rotation are odd isotopes of Mercury $Hg^{199}$ and $Hg^{201}$. Unpolarized intensity modulated light from a pump lamp is directed by lenses to a linear polarizer, quarter wave plate combination producing circularly polarized light. The circularly polarized light is reflected by a mirror to the cell transverse to the field for optical pumping of the isotopes. Unpolarized light from a readout lamp is directed by lenses to another linear polarizer. The linearly polarized light is reflected by another mirror to the cell transverse to the field and orthogonal to the pump lamp light. The linear light after transversing the cell strikes an analyzer where it is converted to an intensity-modulated light. The modulated light is detected by a photodiode processed and utilized as feedback to control the field and pump lamp excitation and readout of angular displacement.

4 Claims, 12 Drawing Figures

NUCLEAR MAGNETIC RESONANCE GYROSCOPE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a nuclear magnetic resonance gyroscope and in particular to a nuclear magnetic resonance gyroscope which utilizes parallel plate magnetic field coils to provide a uniform DC magnetic field about a resonance cell and transverse pumping of the resonance cell.

Current nuclear magnetic resonance gyroscopes incorporate resonance cells, pump and readout lamps, optics, and associated electronics for control and signal processing. Isotopes are encapsulated in the resonance cell centrally positioned in a DC magnetic field generated by a hemmholtz or cylindrical field coil and a current source. The precession of the nuclear magnetic moment is sustained by an AC magnetic feedback field. The pump lamp is comprised of a single isotope which is excited to produce the light required for the optical pumping of the resonance cell. The readout lamp is identical in construction to the pump lamp and is used for determing angular changes. The techniques used in the readout process are the Faraday and Dehmelt. For both techniques intensity modulated light is detected by a photodetector. The signal is amplified, conditioned, and demodulated to produce the correct signal for control and information processing. Degradation of performance of existing nuclear magnetic resonance gyros occurs because limited magnetic field uniformity is provided in both the transverse and longitudinal direction; external magnetic fields couple with the DC magnetic field of the gyro altering the direction of the sensitive axis from that defined on the gyro case; phase shifts are introduced by a change in angle between the feedback field, light beam direction and DC magnetic field; and the feedback field interacts with the atomic sublevels of the isotopes reducing their relaxation time and affecting performance.

SUMMARY OF THE INVENTION

Accordingly, it is an object of this invention to provide a nuclear magnetic resonance gyro having a uniform magnetic field. It is another object of the invention to provide improved shielding so that external magnetic fields do not couple with the DC magnetic field and alter the direction of the sensitive axis. It is a further object of the invention to eliminate changes in angle between the feedback field, the direction of the light beam and the DC magnetic field. It is still a further object of the invention to provide a nuclear magnetic resonance with gyro with no feedback field, thereby preventing a reduction in the relaxation times of the isotopes.

Briefly, these and other objects of the invention are achieved as follows:

A resonance cell, utilizing Mercury isotopes $Hg^{199}$ and $Hg^{201}$ encapsulated therein for sensing rotation, is centered in a parallel plate magnetic field coil. The coil structure produces an extremely uniform field in the region of the sample cell. It also serves as an additional shunt path for external fields. A pump lamp is excited by an RF oscillator and maintained at threshold by the use of a power amplifier. A feedback loop controls the gain of the power amplifier thereby modulating the light intensity at the precessional frequency of the nuclei (Lamour frequencies) for optical pumping. The modulated unpolarized light beam is transformed into modulated circular polarized light by directing it through a linear polarizer, quarter-wave plate combination. The circularly polarized light is then redirected by a mirror to the resonance cell for optical pumping along an axis transverse to the magnetic field. A readout lamp is excited in a similar manner as the pump lamp. The unpolarized light beam is directed through a set of lenses and a linear polarizer to produce linearly polarized light. The linear polarized light is redirected by a mirror to the resonance cell along another axis transverse to the magnetic field and orthogonal to the pump beam. The readout beam's plane of polarization is continuously varied by the motion the nuclei in the resonance cell. This oscillation is transformed into intensity-modulated light by a suitably oriented analyzer. The intensity-modulated light is then detected by a photodetector and utilized in the control and signal processing electronics for field and pump lamp control and angle processing.

Other objects, advantages and novel features of the invention will become apparent from the following detailed description of the invention when considered in conjunction with the accompanying drawings.

DESCRIPTION OF THE PREFERRED EMBODIMENT

Figure 1:
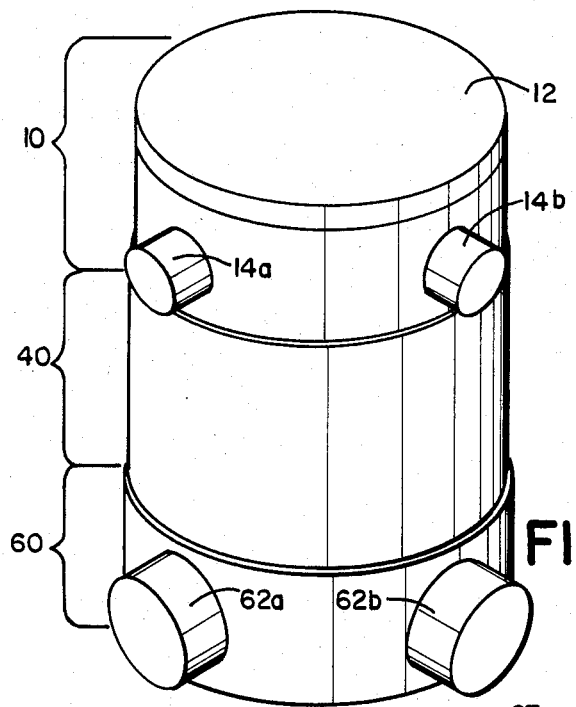
FIG. 1 shows a nuclear magnetic resonance gyroscope according to the invention.
Figure 2:
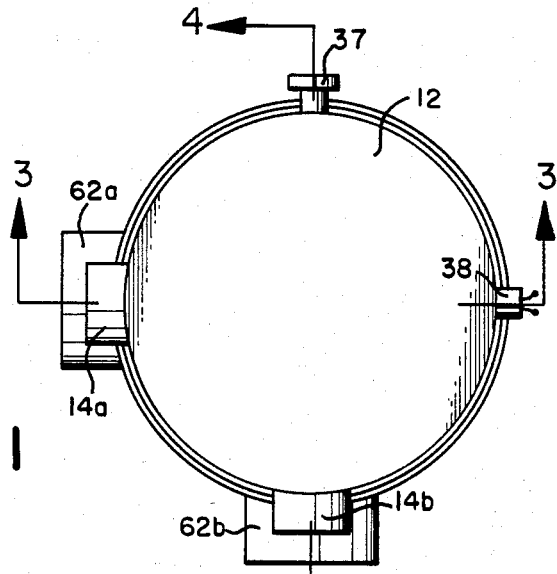
FIG. 2 is a top view of the nuclear magnetic resonance gyroscope shown in FIG. 1.

Referring now to the drawing, wherein like reference characters designate like or corresponding parts throughout the sevral views, there is shown in FIG. 1 a nuclear magnetic resonance gyro having three modular sections; a resonance cell container 10, a lens stack container 40 and a base container 60.

Figure 3:
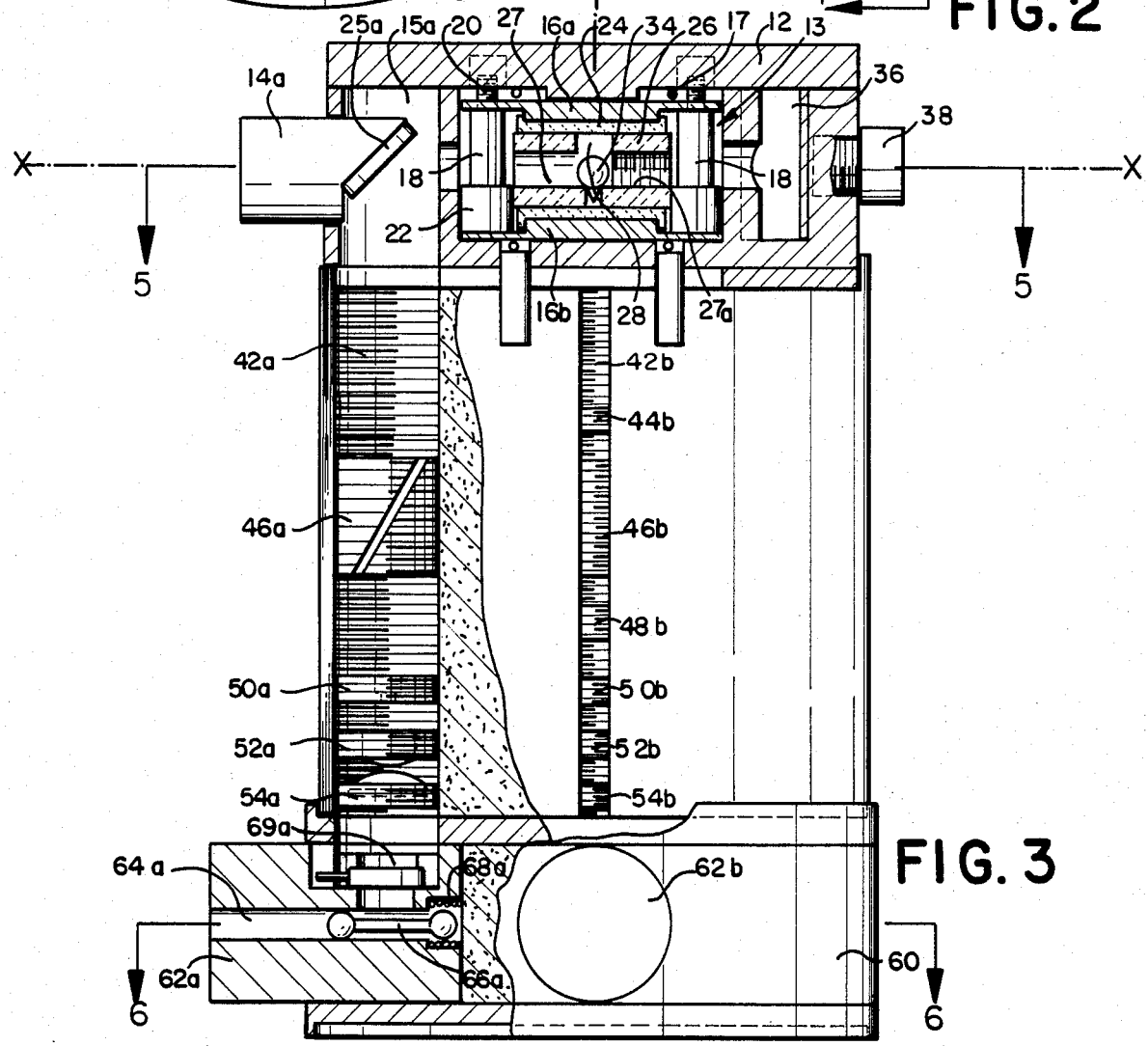
FIG. 3 is a cross-sectional view of the nuclear magnetic resonance gyroscope taken along the line 3—3 of FIG. 2.
Figure 4:
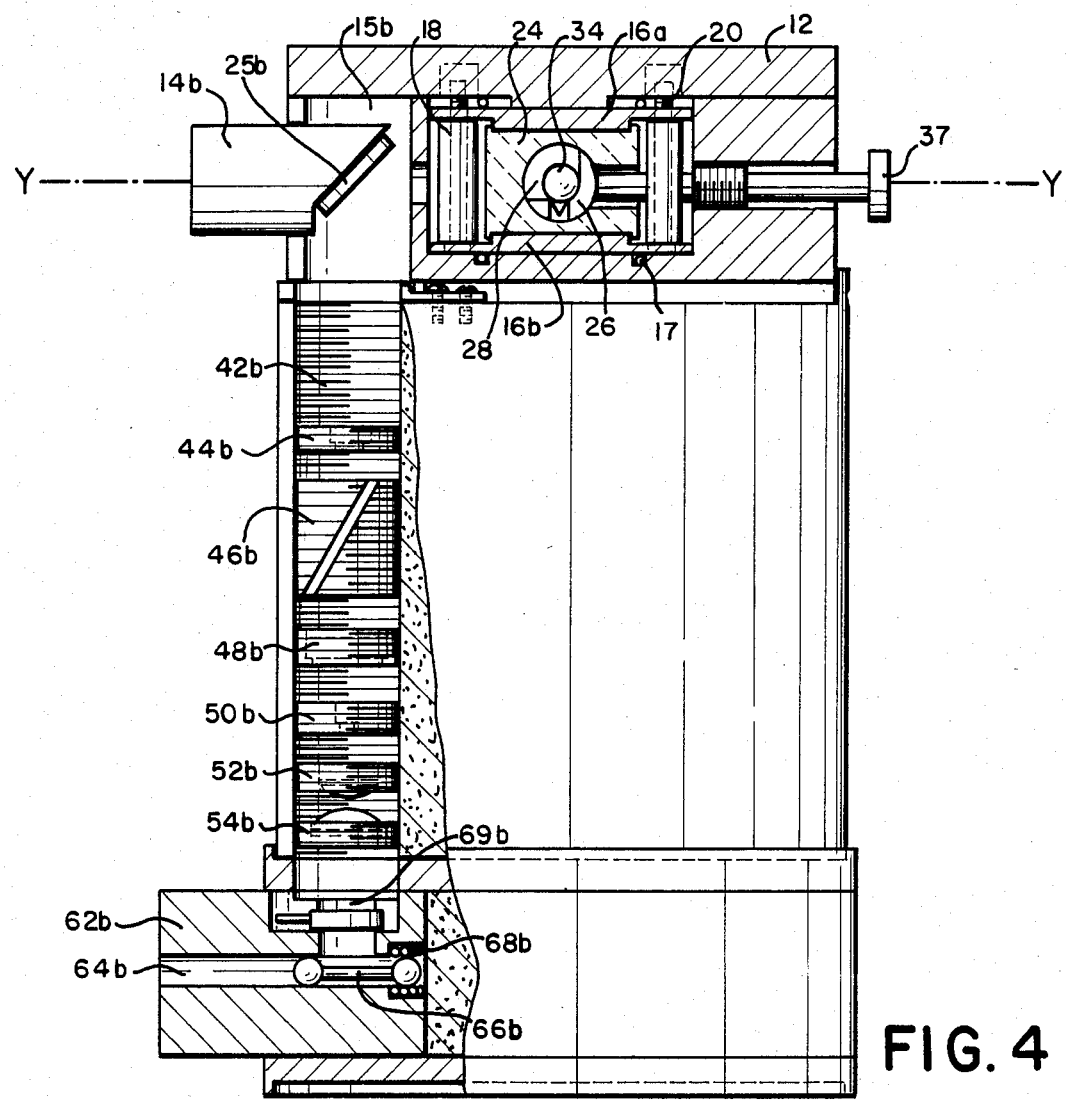
FIG. 4 is a cross-sectional view of the nuclear magnetic resonance gyroscope along the line 4—4 shown in FIG. 2.
Figure 5:
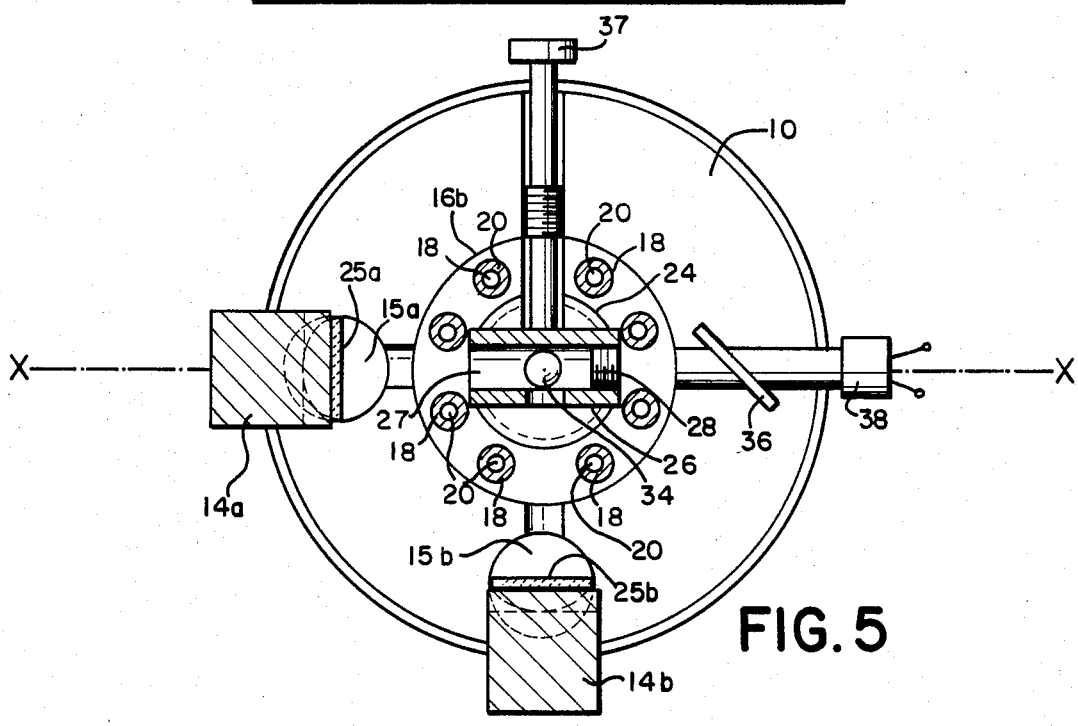
FIG. 5 is a cross-sectional view taken along the line 5—5 of FIG. 3.
Figure 6:
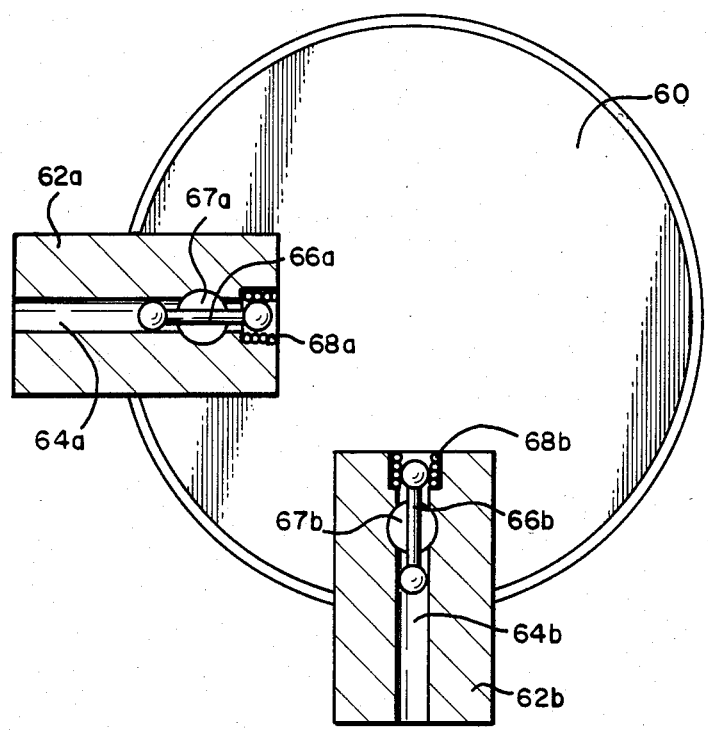
FIG. 6 is a cross-sectional view taken along the line 6—6 of FIG. 3.
Figure 7:
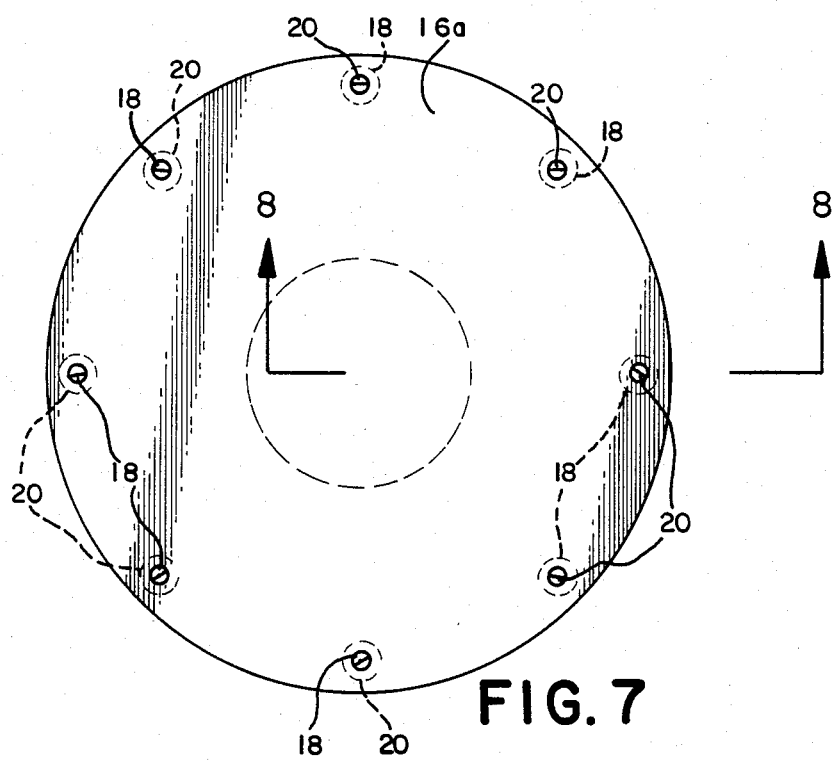
FIG. 7 is an exploded top view of the parallel magnetic plate field coil according to the invention.
Figure 8:
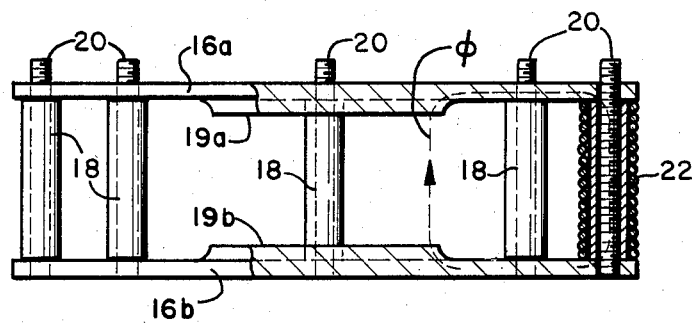
FIG. 8 is a partial cross-sectional view of the parallel magnetic plate field coil taken along the line 8—8 of FIG. 7.

Cell container 10 shown in FIGS. 3, 4 and 5 has mirror mounts 14a and b inserted through the walls thereof positioned orthogonal to each other between cover 12 and lens stack container 40. Mount 14a is centered on a readout beam R, axis X, passing through the center of a resonance cell 34 and mount 14b is centered on a pump beam P axis Y orthogonal to the X axis and also passing through the center of resonance cell 34. A Z axis is defined as passing through the center of cell 34 and perpendicular to both the X and Y axis. Positioned in the center of cell container 10 is a cell cage 24 having inserted in the center thereof on the X axis a cylindrical spool 26. Spool 26 is used to secure the position of a resonance cell 34 in the center thereof. Rotation and alignment of the symmetric axis of cell 34 is achieved by positioning spool 26 after withdrawing brake rod 37. Resonance cell 34 comprises a transparent sealed quartz-pyrex envelope containing mercury vapor of odd isotopes $Hg^{199}$ and $Hg^{201}$. Cell 34 is centrally positioned in a DC magnetic field $H_o$ generated by an electronically computer regulated stable current source which maintains field $H_o$ constant. Spool 26 having a hole 27 longitudinally therethrough for allowing the readout beam R to pass through to cell 34 and having at one end therein a threaded portion 27a for insertion of an alignment tool (not shown) in place of photodetector 38. A U shaped notch 28 is located in the center of spool 26 in line with the Y axis for permitting pump beam P to strike cell 34. A cavity 29 is located below U shape notch 28 and the center of spool 26 for holding cell 34 envelope sealing point. Spool cage 24 has a hole therethrough aligned on the X axis in which spool 26 is positioned. Brake rod 37 is positioned and held against spool 26 for maintaining the position of cell 34. Cage 24 with spool 26 and cell 34 therein is interposed between parallel plates 16a and b. Plates 16a and b are fabricated from a material having a high permeability such as silicon core c iron having a permeability equal to 6,000. Proper separation between the upper and lower plates 16a and b respectively are maintained by cage 24. Cage 24 is cylindrical and has a lip extending above and around the perimeter of the top and bottom sides. FIGS. 7 and 8 are expanded views of the parallel plate magnetic field coils. FIG. 8 in particular shows a cross-sectional view illustrating the magnetic flux path $\phi$ through the parallel plates 16b across the air gap to parallel plate 16a through 16a to the top of coil 22. Plates 16a and 16b are disk shaped but have an area 19a and 19b about the center which is thicker than the outer periphery area of the disk shaped plates. Said thicker portions of plates 16a and 16b fit snuggly within the circumferential lip on the top and bottom of cage 24 respectively. The increased thickness of the center area of plate 16a and b provide an addition flux path to concentrate the magnetic field in the central area than would a flat disk. Parallel magnetic plates 16a and 16b are directly connected together by eight coils 22 each coiled about an adjustable core 18 and symmetrically located about the perimeter of plates 16a and b. Coils 22 are connected in a series string and the current therethrough automatically regulates the DC magnetic field. Coil 22 wire is capable of withstanding 300 degrees C. Core 18 is comprised of high permeability material such as silicon core C iron and is internally threaded therethrough having an adjustable magnetic center rod 20 which can be turned into or out of core 18 to change the permeability thereof and hence the magnetic field $H_o$. The adjustment provides the ability to fine tune the field $H_o$ in the central area of plate 16a and b which has magnetic irregularities due to nonuniformity in material. Grooves have been cut into the well of container 10 where the parallel plate 16b rests for a heater coil 17. Heater coils 17 are also placed over plate 16a to provide symmetrical heating of the resonant cell 34. Heater coil 17 provides 600 watts at turn on. Coil structure 18 is positioned within the cell container 10 so that the axis of symmetry of hole 27 is aligned along axis X. Mounts 14a and 14b inserted through the walls of container 10, orthogonal to each other, extend partially into shafts 15a and 15b respectively. The center of 14a and 14b lie on the axis X and Y respectively. Mirrors 25a and 25b are attached to mountings 14a and 14b respectively and are positioned to reflect light received from lens well 42a and 42b onto the X axis and Y axis respectively. Analyzer 36 is positioned at 57.40 degrees away from the perpendicular with respect to the direction of propagation of readout beam R provides the intensity modulated light I for detection by a photodetector 38 positioned on the X axis opposite of mirror 25a. Cell container 10, cage 24, spool 26, mirror mounts 14a and b and cover 12 are made of a ceramic material which requires no firing after machining and has physical characteristics conclusive to a gyro such as an extremely low magnetic susceptibility material. Mirror mounts 14a and b and respective mirrors 25a and b are used for directing the readout beam R and a pump beam P along the transverse axes into cell 34.

A lens container 40 as shown in FIGS. 1, 3 and 4 has two threaded cylindrical wells 42a and 42b for containing in a stack configuration all the components necessary to produce circularly polarized light for optical pumping and linearly polarized light for readout respectively. The optical components threadingly stacked in well 42b are a quarter wave plate 44b, a polarizer 46b, a 2537 Angstrom filter 48b, a bi-concave lens 50b, an upper condenser 52b, and a lower condenser 54b. Well 42a contains threadingly stacked therein a polarizer 46a a bi-concave lens 50a, an upper condenser lens 52a, and a lower condenser lens 54a. Lens container 40 is fabricated from a non-magnetic reacting material such as a vulcanized fiber.

Figure 10A:
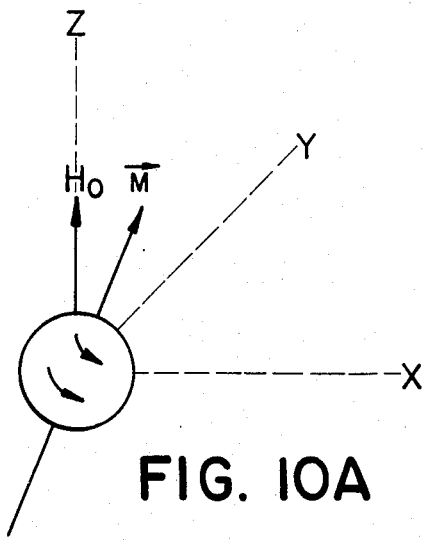
FIG. 10a, is a diagrammatical model of a nucleus indicating the direction of an angular momentum vector resulting from application of a DC magnetic field according to the invention.
Figure 10B:
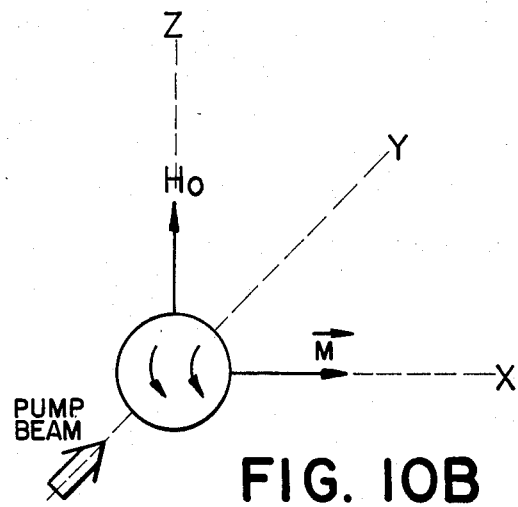
FIG. 10b is the nucleus as shown in FIG. 10a indicating the direction of the angular momentum vector resulting from application of a pump lamp light beam and the D.C. magnetic field.
Figure 10C:
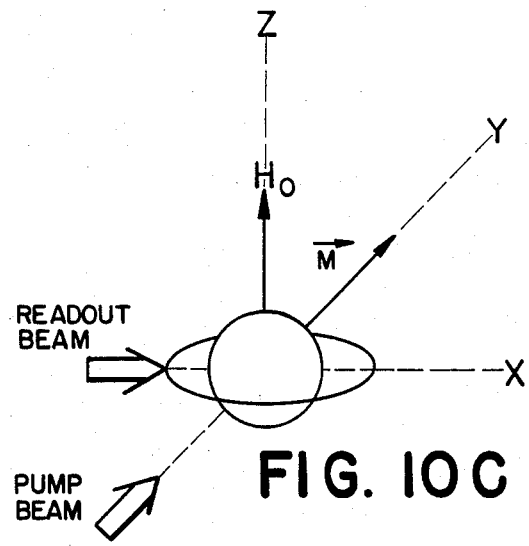
FIG. 10c is the nucleus of FIG. 10b indicating the direction of the angular momentum vector resulting from application of a readout lamp light beam, the pump lamp light beam; and the D.C. magnetic field.

Base block 60 comprises lamp housing 62a and 62b each partially inserted through the wall of container 60 orthogonal to each other. Housing 62a is centered on the X axis and 62b on the Y axis. A pump lamp 66a comprises a quartz envelope having the shape of a miniature dumb bell having two spherical sections connected therebetween by a capillary section encapsulating an isotope whose spectral characteristic match those of the isotopes in cell 34. Pump lamp 66a is maintained in position at one spherical end by a hole 64a and at the other spherical end by an excitation coil 68a coil thereabout. Excitation coil 68a receives current from a gain varied power amplifier 100. A readout lamp 66b having an encapsulated isotope has the same configuration as lamp 66a is positioned in housing 62b at one spherical end in hole 64b and at the other spherical end by an excitation coil 68b coiled thereabout. Light intensity of beams P and R in wells 42a and 42b are adjusted by diaphragms 69a and 69b respectively. The unpolarized intensity modulated pump light beam P from pump lamp 66b is directed through combination of lenses 54b, 52b, 50b, filter 48b, linear polarizer 46b and quarter wave plate 44b producing circularly polarized light and reflected from a mirror 25b onto axis Y into cell 34 transverse to field $H_o$ for optically pumping. Unpolarized readout light beam R from readout lamp 55a is directed through the lenses in well 42a through lenses 54a, 52a, and 50a and linear polarizer 46a and reflected from mirror 25a onto axis Y through cell 34 transverse to field $H_o$ and orthogonal to pump beam P along axis Y. Lamps 66a and 66b have their center capillary portion, aligned with the optical axis of the lens stacks in well 42a and 42b respectively. Diaphragm 69a and 69b positioned above lamps 66a and 66b are used to restrict the amount of light into lens wells 42a and b. Base container 60 and the lamp housings 62a and 62b are constructed from a non-magnetic fibrous material such as an acetyl resin. The isotope encapsulated within the readout lamp 66b has spectral characteristics different from the spectral characteristics of resonant cell 34 to ensure minimal absorption of the readout light beam R. The readout lamp 66b is excited from a 100 mHz clock 102. As shown in FIG. 10c readout beam R interacts with the precessing nucleus of a mercury atom rotating its plane of polarization. An analyzer 36 is positioned at a 57.40 degrees angle away from the perpendicular with respect to the propagation of beam R to convert the translated linearly polarized light from cell 34 into intensity modulated light. A photodetector 38 is connected through the wall of container 10 on the X axis opposite mirror 25a for receiving intensity modulated light I and detecting the modulating signal Am and providing it as voltage fluctuations to electronic circuit 70.

Figure 9:
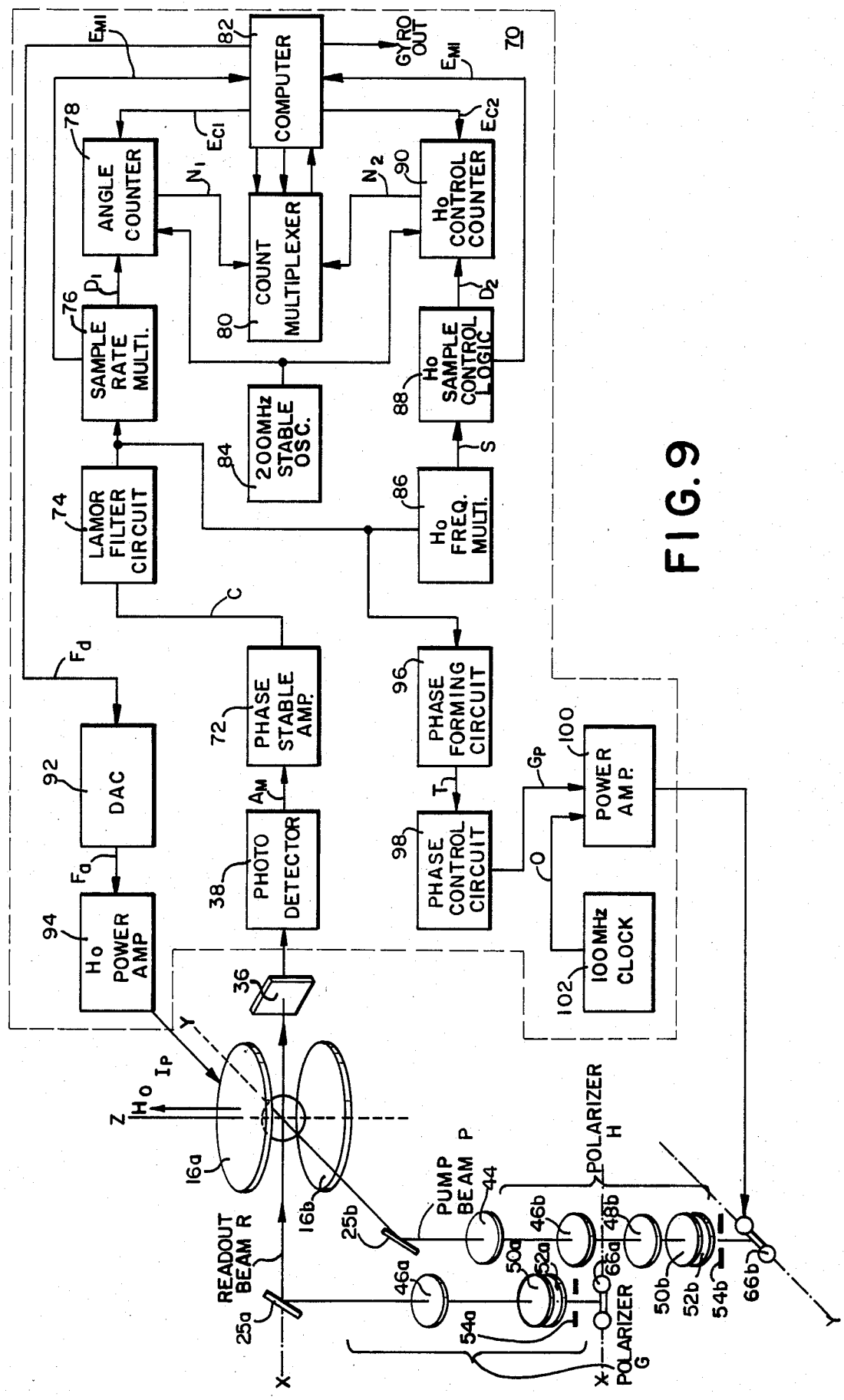
FIG. 9 is a schematic diagram of pump and readout lamp light beam paths and a block diagram of the electronic control circuitry according to the invention.

Electronic circuit 70 separates two precessional frequencies, uses them to control pump lamp excitation and gating of a high frequency oscillator 84 into counting chains 78 and 90. The resultant counts represent the Lamour frequencies plus vehicle rotation rate to a resolution of microhertz. A computer 82 is connected to receive the resultant counts through a multiplexer 80 for processing and providing feedback to control the D.C. magnetic field $H_o$. Electronic circuit 70 shown in FIG. 9 is connected as follows. A phase stable amplifier 72 comprising a voltage amplifier having no phase shift between input and output is connected to receive the detected modulation signal Am from photodetector 38 and to provide a composite signal C having two main frequency components consisting of 369 Hz and 1000 Hz and deviations therefrom resulting from the precessing Mercury isotopes in cell 34. A lamour filer circuit 74 is connected to receive and separate composite signal C into the two main components. A sample rate multiplier 76 is connected to receive both components, convert them from a sinewave to a square wave of the same frequencies, provide two disable signals $D_1$, each having a period one hundred times longer than the input signals, and provide an enabling signal $E_{mi}$ to a computer 82. An angle counter 78 is connected to receive signal $D_1$ and is used to count a 200 megahertz clock pulse from an oscillator 84 for the time period derived by multiplier 76. Angle counter 78 provides a count signal $N_1$ equivalent to the number of pulses it received before receiving disable pulse $D_1$ when enabled from computer 82 by signal $E_{cl}$. A count multiplexer 80 is connected to receive count signal $N_1$ and to transfer it to the computer 82. Computer 82 can be a general purpose computer programmed to receive count signal N, and perform arithmetic operations to calculate and provide the angle of rotational motion about a sensitive axis as defined by the direction of $H_o$ (Z axis).

A frequency multiplier 86 is connected to receive the two frequencies and then by a multiplication technique well known in the art produce the sum frequency signal S all others being filtered. Signal S used to control $H_o$ field. An $H_o$ sample controller 88 is connected to receive signal S, provide a disable signal $D_2$ that is 100 times the period of the incoming signal S and an enable signal $E_{m2}$ to computer 82. The period multiplication increases the resolution of the final change in coil 22 current. An $H_o$ control counter 90 is connected to receive 200 mHz oscillator signal from oscillator 84 and disable signal $D_2$. When signal $D_2$ occurs counter 90 stops incrementing and provides the count signal $N_2$ when enabled from computer 82 by signal $E_{c2}$. Computer 82 is connected to receive count signal $N_2$ and provide a feedback signal $F_d$ consisting of a 16 bit word indicative of the parallel plate magnetic field coil current control. A digital-to-analog converter 92 is connected to receive signal $F_d$ to provide a feedback current $F_a$ which will increase/decrease the current $I_p$ from the power amplifier 94 to the coil 22 so as to maintain the sum frequency signal S constant. A pulse forming circuit 96 such as a Schmidt trigger is connected to receive the precessional frequencies components from Lamour filter circuit 74 and to provide a trigger pulse T, at the rate of the component frequencies. A phase control circuit 98 is connected to receive pulse T for providing a gating pulse $G_p$ having a predetermined pulse width and duty cycle to excite pump lamp 66b at the proper time and for the proper duration to be in phase with the precessing moments of cell 34 nuclei. Lower amplifier 100 is connected to receive a 100 mHz excitation signal O and to provide a threshold level excitation and periodically pulsed by gating pulse $G_p$ increase excitation power. Pump lamp excitation coil 68b is connected to receive the gain varied excitation signal O from pump amplifier 100. Readout lamp excitation coil 68a is connected to receive excitation signal O continuously from 100 mHz oscillator 102.

A triple nested magnetic shield not shown surrounds the gyroscope. The shield cylindrical axis of symmetry is aligned along the symmetric axis (Z axis) of the gyroscope. The shield provides attenuation of all external fields to a nominal value which shall not affect the performance of the instrument.

Operation of the nuclear magnetic resonance gyroscope utilizes the intrinsic property of certain nuclei to determine angular displacement about a defined input axis. The nuclei have angular momentum, hence, a magnetic moment. When the nuclei are placed in a weak magnetic field, they precess about the direction of the field as defined by equation 1.

$$\omega = \gamma H_o \qquad \text{Equation 1}$$

$\omega_L$ is the precessional frequency;

$\gamma$ is the gyromagnetic ratio, and $H_o$ is the DC magnetic field whose direction defines the input axis of the gyroscope. As illustrated in FIG. 10, field $H_o$ lies on the Z axis. An ensemble of aligned nuclei must be established in order to obtain a detectable signal. This is performed by a technique known as optical pumping. A beam of circularly polarized light is produced and directed at the resonant cell containing the atoms in a gaseous state. The light of proper wavelength is absorbed by the atoms. The atoms then align themselves along the direction of the pumping beam. According to the invention, the pump beam is directed perpendicular to the direction of the magnetic field $H_o$ as illustrated in FIGS. 9 and 10. The reoriented atoms now in a position perpendicular to $H_o$ experience a torque which causes them to precess about field $H_o$. This is a free precession gyroscope. A feedback signal is established through the readout circuit and is utilized to modulate the pump lamp intensity. In this manner, the pump lamp is in phase with the precessing ensemble replacing those nuclei which have lost their coherence due to decay processes going on in the resonance cell. This establishes an equilibrium ensemble or net magnetc moment capable of producing a detectable signal. Readout of the net magnetic moment is achieved by utilizing the Faraday technique. A beam of linearly polarized light in the same plane as the pump beam being orthogonal is directed at the resonant cell 34. As the linear light traverses the cell, the plane of polarization varies due to its position with respect to the precessing net magnetic moment. The light is then transformed into intensely modulated light by an analyzer 36 and is sensed by a photodetector 38. The observed signal of $\omega_1$ is given by equation 2.

$$\omega_1 = \omega_L + \omega_R \qquad \text{equation 2}$$

where $\omega_R$ is vehicle rotation sensed by the gyroscope along the direction of field $H_o$. If a single nuclei were to be used, it would be extremely difficult to produce accurate angular measurements because of the stability requirement that would have to be imposed on $H_o$ field. To overcome this difficulty, two nuclei are placed in a single cell. The detected signal is then the sum of the individual signal from the cell given by equation 3.

$$\omega = \omega_1 + \omega_2 \qquad \text{equation 3}$$

where $\omega_2$ is the precessional frequency of the second nuclei and is identical to equation 2 except for a change in sign for $\omega_R$. Utilizing equation 3 and substituting in 1 and 2, the field control is expressed by equation 4.

$$H_o = (\omega_1 + \omega_2)/(\gamma_1 + \gamma_2) \qquad \text{equation 4}$$

Field control is a matter of measuring $\omega_1 + \omega_2$ and processing this information with the predetermined value of $\alpha_1$ and $\alpha_2$. Electronically, the gyro output signal is separated then beat together to produce the sum and difference. The difference frequency is filtered leaving the sum which is independent of $\omega_R$. The sum signal is then utilized to control an accounting chain from an extremely stable high frequency crystal oscillator. After the counting cycle is completed, the information is multiplexed into a computer for use in controlling a digital to analog converter for controlling the current field $H_o$. This eliminates the requirement for an ultra stable current source required in a single nuclei approach. Vehicle angular information is based upon a difference between $\omega_1 + \omega_2$ and is given by equation 5.

$$\omega_R = \frac{(\omega_1 - \omega_2)\gamma_1/\gamma_2}{a - \gamma_1/\gamma_2} \qquad 65$$

Equation 5 was based upon equation 2 and identical quation for $\omega_2$. The difference frequency is utilized in the same manner as the sum frequency in the field $H_o$ and sum frequency in the $H_o$ control circuitry. The information after the gating is completed is multiplexed by multiplexer 82 into computer 82 and a calculation is performed to determine $\omega_R$.

Pump beam lamp 66b is excited by current supplied from pump amplifier 100 through winding 68b. Upon excitation, unpolarized light is directed through diaphragm 69b through the lens polarizer and quarter wave plates stacked in lens well 46b. Now circularly polarized light beam P is reflected from mirror 25b onto the Y axis into resonant cell 34.

Readout lamp 66a obtains excitation from 100 mHz clock 102 and emits unpolarized light through the lens stack in lens well 46a. Linearly polarized light beam R exits well 46a and is reflected from mirror 25a onto the X axis through the resonant cell 34 to analyzer 36 and then as amplitude modulated light to photodetector 38. The voltage fluctuation from detector 38 are separated into the two precessional frequencies and utilized to control pump lamp 66b excitation, the current flow through coils 22 and provide vehicle rotation rate.

Some of the many advantages of the present invention should now be readily apparent. The invention provides parallel plate magnetic field coil which shunts external magnetic fields and produces an extremely uniform field in the region of the resonant cell. The invention uses a transverse AC pumping technique, thereby eliminating the effect of phase shifts which occur between the AC feedback magnetic field and the precessing nuclei, eliminating the angle change between the feedback magnetic field, light beam direction and the DC magnetic field, and reducing the relaxation time due to the interaction of the AC feedback magnetic field with the atomic sublevels.

Obviously, many modifications and variations of the present invention are possible in view of the above teaching. It is therefore to be understood that within the scope of the appended claims the invention may be practiced otherwise than as specifically described.

What is claimed is:

1. A nuclear magnetic resonance gyroscope which derives rotational information from the phases of precessing nuclear moments for determining the angle of rotation of the gyroscope about a predetermined axis comprising:
   a resonance cell containing samples of isotopes of an element for producing nuclear magnetic resonance signals is mounted on the predetermined axis;
   plate means including a pair of metallic plates for producing a uniform unidirectional magnetic field oriented along the predetermined axis and intersecting said resonance cell for causing free precession of the net magnetic moment therein, said plates being spaced therebetween by a plurality of radially spaced coils symmetrically positioned around the perimeter of said plates, each of said coils being wound about a permeability adjustable metallic core with the lateral axis aligned with the predetermined axis intersecting the resonance cell located within said plate means;
   first optical means for periodically increasing the magnitude of the net magnetic moment of said resonance cell transverse to said magnetic field;
   second optical means transverse to said magnetic field and orthogonal to said first optical means for detecting the phase of the magnetic moment of said resonance cell;

output means for processing said detected phases to produce an output signal indicative of the rotation of said gyroscope about said predetermined axis, a feedback signal for controlling said first optical means, and a second feedback signal for controlling said magnetic field.

2. The gyroscope as set forth in claim 1 wherein said plate means further comprises a pair of metallic disks having an area about the center thereof having increased thickness for providing an additional flux path for said magnetic field to intersect said resonance cell.

3. Apparatus for generating a uniform magnetic field comprising, in combination:

a pair of spaced coaxial circular plates of magnetic material, each plate having a raised circular and planar surface parallel to and confronting the raised surface of the other plate forming a uniformly thicker portion about the center;

a plurality of parallel magnetic coils connected at their ends between said plates and symmetrically spaced about the thinner portion of said plates for generating a magnetic field in the space between said surfaces; and a plurality of magnetic rods inserted in one end of respective ones of said coils, the insertion length being adjustable for varying the flux density in the space between said surfaces to obtain a uniform magnetic field.

4. Apparatus according to claim 3 wherein each of said rods are threadingly inserted in said coils for altering the permeability thereof.

* * * * *